US005173351A

United States Patent [19]

Ruppel et al.

[11] Patent Number: 5,173,351

[45] Date of Patent: Dec. 22, 1992

[54] ABSORBENT COMBINED SHEET MATIERIAL

[75] Inventors: Remy Ruppel, Horbourg; Pierre Laurent, Kunheim; Joel Hungler, Colmar, all of France

[73] Assignee: Kaysersberg, S.A., Kaysersberg, France

[21] Appl. No.: 605,346

[22] Filed: Oct. 30, 1990

[30] Foreign Application Priority Data

Oct. 30, 1989 [FR] France ............ 89 14202

[51] Int. Cl.[5] ............ B32B 1/00; B32B 3/00

[52] U.S. Cl. ............ 428/1.74; 428/154; 428/156; 428/166; 428/172; 428/178; 428/179; 428/182; 162/111; 162/112; 162/113

[58] Field of Search ............ 428/174, 178, 182, 179, 428/172, 154, 156, 166, 535, 180; 162/111, 112, 113; 156/209, 219

[56] References Cited

U.S. PATENT DOCUMENTS

| | | | |
|---|---|---|---|
| 3,017,317 | 1/1962 | Voightman | 428/154 |
| 3,414,459 | 12/1968 | Wells | 428/535 |
| 3,672,950 | 6/1972 | Murphy | 428/154 |
| 4,100,017 | 7/1978 | Flautt | 162/111 |
| 4,320,162 | 3/1982 | Schulz | 428/154 |
| 4,671,983 | 6/1987 | Burt | 162/113 |
| 4,978,565 | 12/1990 | Pigneul | 428/178 |

*Primary Examiner*—Ellis P. Robinson
*Assistant Examiner*—Nasser Ahmad
*Attorney, Agent, or Firm*—Breiner & Breiner

[57] ABSTRACT

A combined sheet material including at least two absorbent sheets, such as of cellulose-cotton, each having a density of between from 10 to 40 g/m$^2$. Each of the sheets is separately embossed by calendaring them into a pattern of protuberances distributed in a first pitch along a first direction for each sheet ($P_1sm$, $P_2sm$) and in a second pitch in a second direction for each sheet ($P_1st$, $P_2st$) which subtends the first direction at an angle other than zero. The end of the protuberances extending away from the plane of each of the sheets includes a flat bonding element whereby the two sheets are bonded to each other, preferably by gluing. The pattern of each of the sheets is characterized in that the first pitch of each sheet along the first direction is different and related by the equation.

$$|1/P_1sm - 1/P_2sm| \geqq 1/L1$$

wherein L1 is a predetermined value corresponding to the dimension of a segment within the combined sheet material in which at least one spot capable of bonding the two sheets together is present regardless of the relative position of the two patterns.

9 Claims, 3 Drawing Sheets

ABSORBENT COMBINED SHEET MATIERIAL

FIELD OF THE INVENTION

The present invention is directed to absorbent combined sheet material, in particular made of creped paper, suitable for sanitary, household or kitchen uses.

BACKGROUND OF THE INVENTION

U.S. Pat. No. 3,414,459 describes a sheet of absorbent material made by a method known as point-to-point combination using at least two embossed, creped paper sheets. The embossed pattern in the sheets consists of regularly arrayed protuberances having a density of 3 to 30 protuberances per $cm^2$. The protuberances on each sheet are made by mechanical deformation using a metal cylinder relief engraved with a desired pattern and a smooth rubber cylinder. The protuberances are present on the same side of the plane of each sheet. The height of the protuberances are between 0.2–1 mm. The protrubences take up about 10–60% of the total surface area of the sheet.

In order to provide paper sheets with the flexibility, compressibility and softness required in a paper sheet product useful for sanitary and household applications, mechanical calendaring is applied to a double sheet structure which issues from bonding cylinders during the making of the sheet product so that the thickness of the sheet is reduced by at least 50%. The purpose of this treatment is to lower the compressive modulus of the double sheet structure, i.e. lower the resistance of the sheet to deformation when the sheet is subjected to compression applied perpendicularly to its principal plane. Accordingly, when a user handles the sheet, a greater softness and sponginess will be felt.

As described in the aforementioned patent, two sheets are bonded by passing the sheets through a nip present between two identical, metal embossing cylinders. Such cylinders are positioned in parallel relationship to each other and are driven by belts or other equivalent means in such a manner that their rotational speeds are equal but opposite. The drive means are adjusted so that the protrubences on the cylinders coincide as precisely as possible in the nip.

Implicitly this patent assumes that the metal cylinders are perfectly engraved and that no variation is present between the points of the protrubences. Actually, however, in conventional engraving techniques, two kinds of shifts between the protrubences are possible.

A circumferential shift between the points of the protrubences located on the same theoretical cylinder generatrix can occur. For example, in a cylinder 2.60 m long, a 5/10 mm circumferential shift was measured between the end protrubences on the same generatrix. This shift occurs independently of the pattern density.

Additionally, an axial shift along the same generatrix is possible with an amplitude being a sinusoidal function with a frequency depending on the pattern density of the particular production method. The more dense the pattern, the higher the oscillation frequency along the generatrix. A maximum amplitude of 1/10 mm was measured with respect to the cylinder referred to above.

These manufacturing tolerances do not affect the bonding quality between two sheets of material when the contact surface of the protrubence points is fairly large. The probability is slight in that situation that two protrubence points equally indexed on two cylinders would be so mutually shifted that they would no longer result in bonding. Additionally, when a double sheet structure made by this method is transformed into rolls of narrow working widths, for example, 10, 20 or 30 cm, unbonded sheets are not observed.

However, when this bonding technique is used with previously embossed sheets of creped paper having a fine or dense pattern and comparatively small contact areas, it was found that entire zones constituting strips in the machine direction of advance were not bonded. Accordingly, when these sheets were processed into rolls, such as sanitary paper, having a working width of less than that of the nonbonded strips, cut off products consisting of two unbonded, wound sheets were found to be present within the unbonded strip areas. The waste of material therefor is significant.

OBJECTS OF THE INVENTION

Accordingly, a primary object of the present invention is to solve the above-described problem by providing a combined sheet material wherein the degree to which the sheets forming the material are unbonded due to a misalignment between the embossing protrubences is predetermined and controlled.

BRIEF DESCRIPTION OF THE INVENTION

The present invention involves a combined sheet material including at least two absorbent sheets, in particular of creped paper, each having a density of from between 10 to 40 $g/m^2$. Each sheet is separately made by calendar-embossing so that each sheet has a pattern of protrubences formed therein spread over the sheet according to a first pitch in a first direction ($P_1sm$, $P_2sm$) and to a second pitch in a second direction ($P_1st$, $P_2st$) wherein the second direction subtends the first direction at an angle other than zero and wherein the end of the pitch or protrubence extending away from the unembossed plane includes a flat bonding element. The method of manufacturing the combined sheet material further includes bonding the two separately embossed sheets to each other using the flat bonding elements of the embossing cylinders which are made to at least partially coincide. The combined sheet material formed is characterized in that the pitches of the first direction of the two sheets ($P_1sm$, $P_2sm$) are interrelated as follows:

$$|1/P_1sm - 1/P_2sm| \geqq 1/L1$$

wherein L1 is a predetermined value corresponding to the dimension of an arbitrary segment extending parallel to the first direction which contains at least one spot or point at which the two embossed sheets will bond together regardless of the relative position of the separate embossed patterns on the separate sheets. As clear from the equation above, only the absolute value, i.e. positive value, of the pitch relationship is taken into consideration. Accordingly, before the pitch of each pattern is defined in the selected direction, where the direction can be the direction of advance of the sheets from the manufacturing machine or can be the transverse direction of the sheets as they move from the manufacturing machine, the maximum range of the indentations of the embossment that are to be present in the combined sheet material in the selected direction is to be ascertained. This value equals L1. Once L1 has been determined, a pattern having pitches meeting the requirements described above are selected.

The maximum range of indentations to be present is determined based on observing a length of the sheets produced in the selected direction from a bonding point, i.e. the point at which two protrubences coincide with one another. The protuberances are implanted in an apparently identical manner on each sheet. However, on viewing the sheets in the selected directions, it can be seen that the protuberances are opposite each other initially, then after a certain distance they progressively move apart until they no longer coincide and thereafter they begin to move closer again. When the contact surface between coinciding protuberances drops below a given threshold, no bonding or connection is any longer possible between those points. Generally, the gap present between the points varies in an amount of between a maximum of half a pitch and zero. This misalignment between protuberances is caused by inevitable manufacturing tolerances. An initially infinitesimal offset between two adjacent embossing protuberances eventually accumulates and due to the large number of embossings which take place eventually becomes noticeable resulting in areas of non-bonding. Since such offset, however, does not affect all protrubences, eventually the sheets being embossed arrive at a point at which a sufficient number of pitches between the protuberances are present that again result in bonding. This misalignment of the protuberances results in the formation of wide and unbonded pockets within the combined sheet material formed. To a certain extent this phenomenon can be analogized to beats when composing two sinusoidal vibrations in the same direction but of slightly different frequencies.

From observing the embossing process in the selected first direction (sm), it is shown from an analysis of the above-described phenomenon, that when the misalignment between the embossing protuberances again reaches a minimum, that the number of pitches between the protuberances from the occurrence of the last minimum misalignment equals a value n for the sheet with a pattern having the pitch $P_1sm$ and a value $(n+1)$ for the sheet with a pattern having pitch $P_2sm$. This allows a distance PL to be defined according to the following two relationships: $PL=nP_1sm$ and $PL=(n+1)\ P_2sm$ wherein $P_1>P_2$. By eliminating n, the relationship can be restated as $1/PL=1/P_2sm-1/P_1sm$. The distance PL can be termed the "bonding pitch". PL corresponds to the distance which separates the two zones of the combined sheet material that are capable of bonding the sheets present where it is understood that in each zone, the contact area between the embossings is sufficient to allow bonding.

Accordingly, the invention is based on the consideration that the unbonded zones are present within a segment which is as long as the bonding pitch of the two patterns and that this undesirable zone can be made smaller at will by lessening the bonding pitch.

Therefore, by selecting each pattern pitch so that the bonding pitch is less than the maximum allowable unbonded stretch L, the formation of these undesired unbonded zones can be avoided. The pattern pitch is also selected so as to insure that the pattern and bonding remain compatible with the particular use to which the combined sheet material formed will be applied and the constraints entailed by its processing. It is understood that bonding spots present over the distance L can exist at places where protuberances are minimally apart or on either side of those protuberances to the extent that the contact area is adequate. However, the invention provides the assurance that there is at least one bonding between the sheets over the distance L which is sufficient to maintain the sheets together.

The invention is applicable to all pattern embodiments regardless of the particular pattern used. However, the invention is particularly beneficial when a fine or detailed pattern embossing is being perfomed on sheets. More specifically, the invention is particularly beneficial when the embossing pattern has a denseness exceeding 20 protrubences/cm$^2$ but less than 300 protuberances/cm$^2$. When the pattern protrubences present are beyond 300 protuberances/cm$^2$, the distance between the protuberances becomes too small to allow deformation of the absorbent sheets in a distinguishable pattern. The sheet, in that event, will appear to be smooth.

A further feature of the present invention involves utilizing flat bonding elements that provide a combined surface area which approximately equals from about 5 to 30% of the sheet area to be embossed before embossing.

For example, the combined sheet material is made from a strip having a working width of 2.60 m. The strip is then cut, for example, longitudinally into working width bands of 100 mm in order to process the strip into toiletpaper rolls wherein the wound band is precut at regular intervals so as to make elementary sheets having a dimension of $100\times125$ mm$^2$. The pitches of the two patterns are selected in such a way that at least one of the bonding pitches in a first, sm, or second, st, direction will be less than 100 mm. Thereby, each $100\times125$ mm format elementary sheet will reliably include at least one bonding spot. Obviously, this is the minimum requirement. Practically, a sufficiently small bonding pitch is selected so that the $100\times125$ mm elementary sheets are bonded at several points.

The pitches can be selected to be different from one another. However, necessarily a difference in appearance is then present on each side of the combined sheet material. Accordingly, where a combined sheet material having differing front and back sides is to be avoided, the ratio of the pattern pitches of the different sheets in the same direction should be from 1 to 2, and is preferably between 1 to 1.5.

Another preferred feature of the present invention involves providing that the number of spots between sheets effectively bonded by gluing is preferably less than the number of spots in the sheet which are capable of bonding the sheets together. Such partial bonding is preferably carried out to reduce as much as possible the rigidity imparted to the combined sheet material by the glue. Necessarily the partial bonding in order to be effective and in accordance with the present invention must result in bonding between the surfaces of the specific pattern. The gluing is preferably accomplished by one of two means to provide such partial bonding.

One means of providing such partial gluing is to use a glue depositing cylinder wherein the effective deposition area is only a fraction of the area of the sheet to be glued. This is achieved by engraving the surface of the deposition cylinder with a suitable pattern providing this result.

A second means involves embossing at least one of the sheets to be bonded using protuberances of differing heights so that the bonding between the sheets only occurs at the protuberances having the greater height.

Other features and advantages are further evident in the description set forth below.

DESCRIPTION OF THE PRESENTLY PREFERRED EMBODIMENT

The invention will be described in relation to the preferred embodiment wherein two sheets of creped paper are utilized to form a combined sheet material. It is to be understood, however, that additional sheets may be present and that the scope of the invention is not limited to the specific example set forth.

Figure 1:
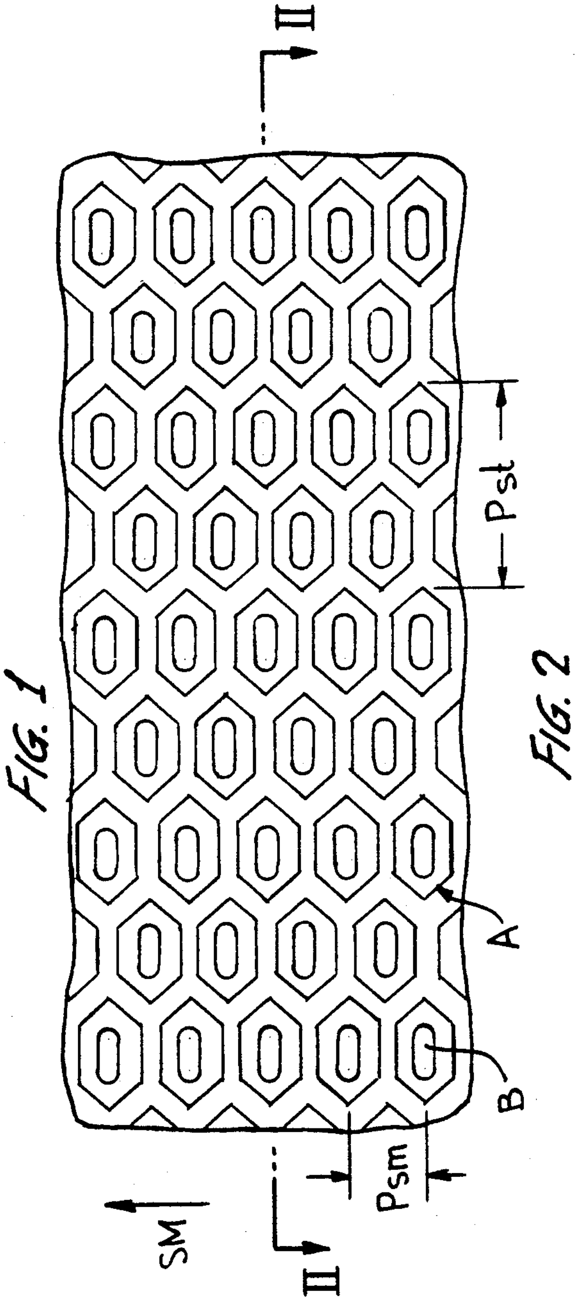
FIG. 1 is a top plan view of a pattern of protuberances engraved on a cylinder.
Figure 2:
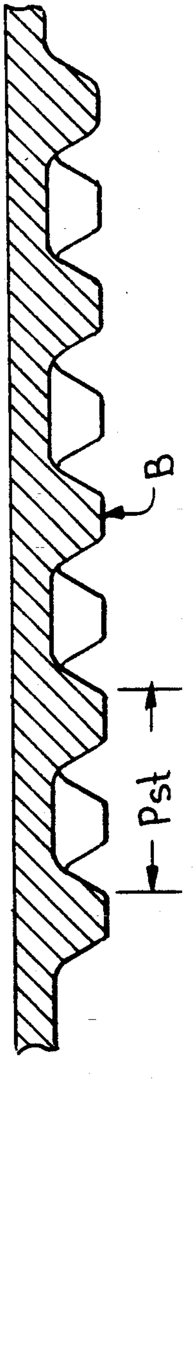
FIG. 2 is a cross-sectional view along line II—II of FIG. 1 of the protuberances array.

FIGS. 1 and 2 show an illustrative embossing pattern for two creped paper sheets, for example, creped paper sheets of absorbent cellulose cotton.

The protuberances A are distributed uniformly in two directions, a first direction Psm and a second direction Pst which subtend between them an angle other than zero. These directions, for ease of illustration, can be understood to be the direction of the machine advance and the direction transverse to the machine advance. In the embodiment shown in FIG. 1, the pattern array is staggered. Other pattern arrays are also suitable for use.

In the direction of the machine advance, the protuberances on each of the first and second sheets are distributed uniformly at a first pitch, i.e. $P_1sm$ and $P_2sm$, respectively. In the transverse direction, the pitches of the first and second sheets are $P_1st$ and $P_2st$ respectively. $P_1sm$ is selected to be different from $P_2sm$ and $P_1st$ is selected to be different from $P_2st$. The top of the protuberances include a flat element B which is located in a plane parallel to the plane of the sheet. Flat element B serves as the point of bonding.

Figure 3:
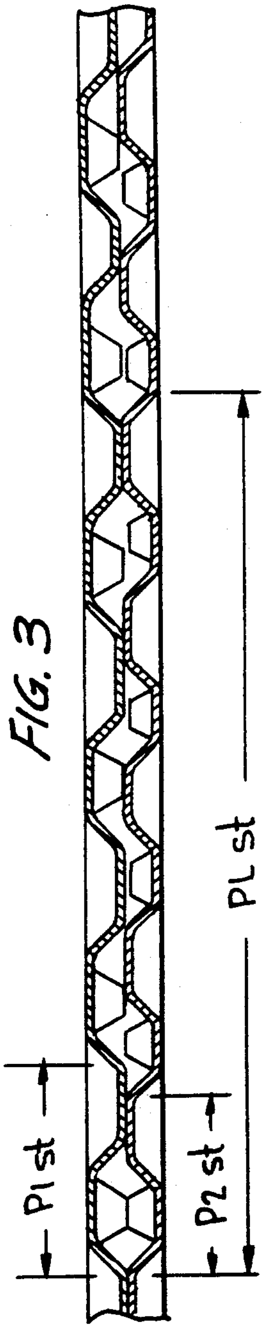
FIG. 3 is a schematic cross-sectional view of a combined sheet material made by combining previously embossed sheets having different patterns.

FIG. 3 is a cross-sectional view in the direction st of a combined sheet material made by spot-against-spot combination of two embossed sheets. When moving along the cutting direction starting from a bonding spot where the protuberances meet each other, it will be seen that the consecutive bonding spots become more or less firm depending on how much the bonding spots meet each other. However, after a distance equal to the bonding pitch PLst corresponding to n pitches $P_1st$ and to (n+1) pitches $P_2st$, the protuberances again are superposed to each other with a maximum contact area. By selecting a sufficiently small value for PL, the width of the zones in which the protuberances do not meet each other will be sufficiently reduced to insure that bonding is present within the given area.

EXAMPLE

A combined sheet material was made in accordance with the present invention from two sheets of absorbent, crepe, cellulose-cotton paper having the same density of 15 g/m². Each sheet was embossed separately in the machine direction of advance Psm and in the transverse direction Pst on cylinders having an embossment pattern consisting of pitch-staggered, oval protuberances, wherein the pitches were different and the denseness ratio was close to one. In the machine direction of advance, the distance L1, which required at least one bond to be present therein, was predetermined to be 100 mm. In the transverse direction, the distance L2, which required at least one bond to be present therein, was predetermined to be 125 mm. The ratio of the densities of cylinders 1 and 5 was 1.08. The pertinent values with regard to the embossing patterns used were as follows:

| | Cylinder 1 | Cylinder 5 |
|---|---|---|
| Pst (mm) | 3.15 | 2.55 |
| Psm (mm) | 1.1 | 1.25 |
| Pattern denseness (per cm²) | 58 | 62.7 |
| Embossed surface | 7% | 7% |
| Embossing height (mm) | 0.6 | 0.6 |

The computed bonding pitch PLsm in the direction of machine advance was 9.16 mm and the bonding pitch PLst in the transverse direction was 13.38 mm.

Following combination of the sheets, it was observed that the combined sheet material formed was free of bonding defects. The elementary sheets having a L1×L2 format, i.e. 100×125 mm², that were cut out of the combined sheet material all included two bonded sheets.

Figure 4:
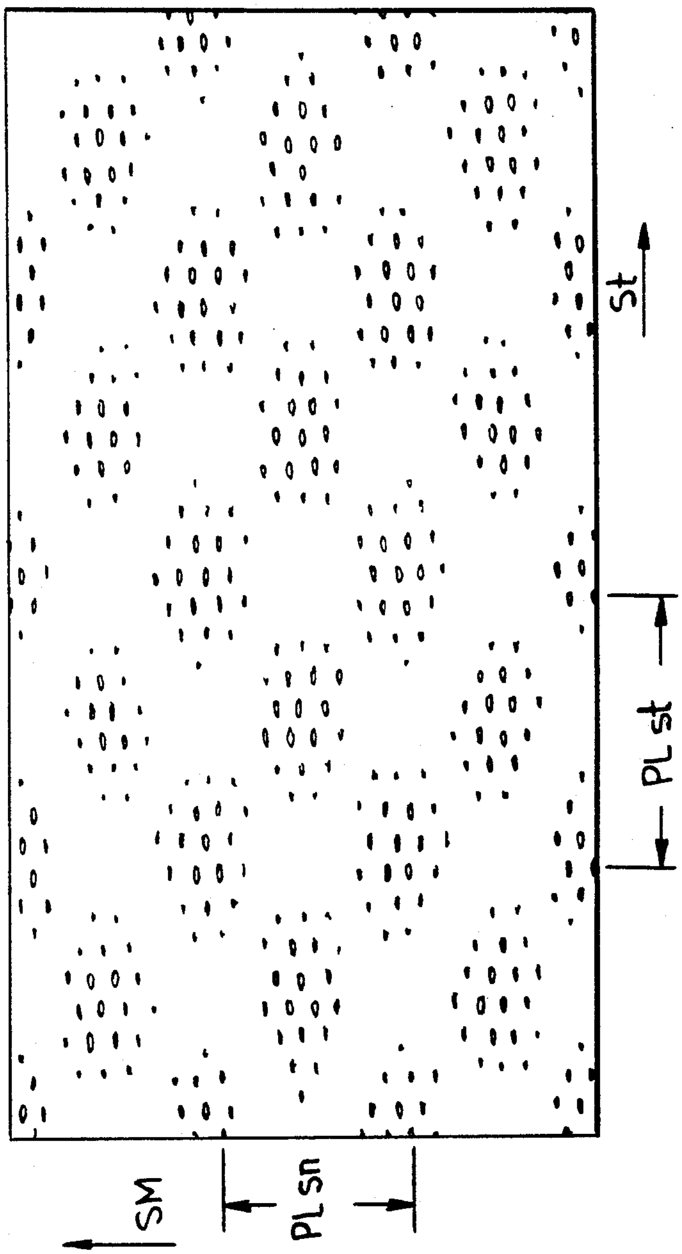
FIG. 4 is a top plan view on a larger scale of the combined sheet material of FIG. 3 showing the zones which lend themselves to bonding.

FIG. 4 illustrates a combined sheet material made having protuberances which will only partially bond. As shown in FIG. 4, these bonding zones themselves form a pattern having a pitch PLst equal to 13.38 mm in one direction and a pitch PLsm equal to 9.16 mm in the other direction.

Since glue imparts some rigidity to the combined sheet material, the amount of glue utilized is preferably minimized as much as possible. The softness of the combined sheet material, therefore, can be improved by gluing only certain defined bonding zones, such as for example the zones shown by the pattern illustrated in FIG. 4. Such pattern gluing can be performed in a simple manner by selecting a gluing cylinder which deposits the glue on a sheet in a pattern matching the bonding pattern.

Apparatus as conventionally known is described below in relation to making the combined sheet material of the present invention.

Figure 5:
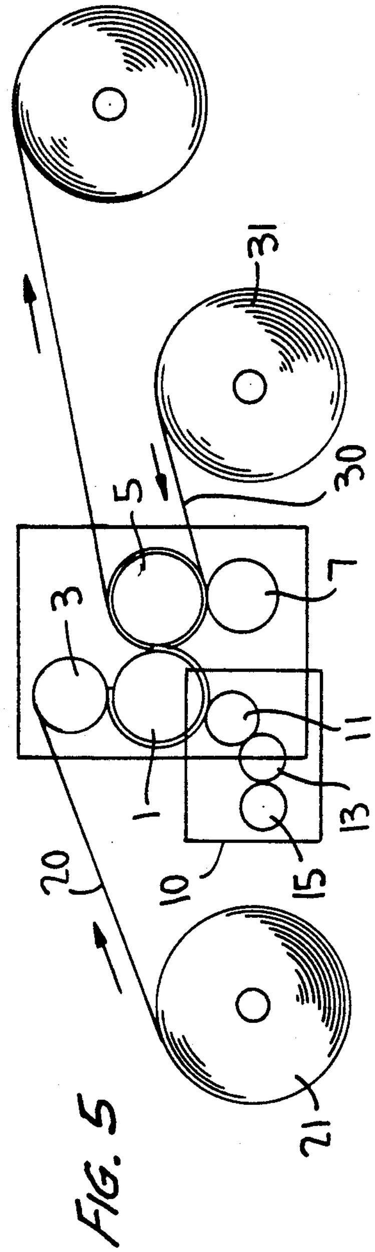
FIG. 5 is a schematic side view of embossing and bonding apparatus suitable for use with the present invention.

FIG. 5 shows a first pair of cylinders 1 and 3. Cylinder 1 is an engraved metal cylinder having relief features formed on its surface in a desired pattern. Metal cylinder 1 is rotatably driven about a horizontal axis in relation to parallel rubber cylinder 3. A nip is formed between cylinders 1 and 3. When passing through this nip, an absorbent sheet of cellulose cotton is mechanically and permanently deformed by the pressure from the relief pattern formed in the metal cylinder.

The apparatus also includes a second pair of embossing cylinders consisting of a metal cylinder 5, of the same diameter and rotating in the same horizontal plane as cylinder 1, and rubber cylinder 7. Cylinder 5 cooperates with rubber cylinder 7 to achieve embossing of a sheet being passed between cylinders 5 and 7.

Cylinders 1 and 5 are positioned in relation to each other to form a nip between them and are driven at opposite but synchronous speeds of rotation so as to roll one on the other without slippage.

The apparatus further includes a gluing system 10 having a glue depositing cylinder 11 made of rubber or other equivalent material which comes to rest on cylinder 1 upstream of the nip present between cylinders 1 and 5. Cylinder 13 serves to transfer glue from a dipping cylinder 15 to the depositing cylinder 11. Dipping cylinder 15 obtains glue from a vat (not shown).

The absorbent paper sheets 20 and 30 which are to be joined are fed from rolls 21 and 31 respectively. Sheet 20 is guided around rubber cylinder 3 so that it passes through the nip between cylinders 1 and 3 and emerges embossed and hugging the relief surface of metal cylinder 1. Depositing cylinder 11 next deposits a metered amount of glue on the surface of the sheet protuberances which form flat elements.

The second sheet 30 also undergoes mechanical embossing by being made to pass through the nip between cylinders 5 and 7. Sheet 30 is then combined with sheet 20 in the nip present between cylinders 1 and 5. The combined sheet material formed is then wound into a roll for future processing.

One means of lessening the quantity of glue deposited on sheet 20 is to bond only a portion of the tops of the protuberances present in sheet 20 rather than depositing glue on all the protuberances. For this purpose, a depositing cylinder can be used which has a surface engraved with a suitable pattern corresponding to the pattern on which glue is to be deposited. Since the protuberances cover only part of the total area of the depositing cylinder, the glue applied by the cylinder will be commensurately reduced.

Figure 6:
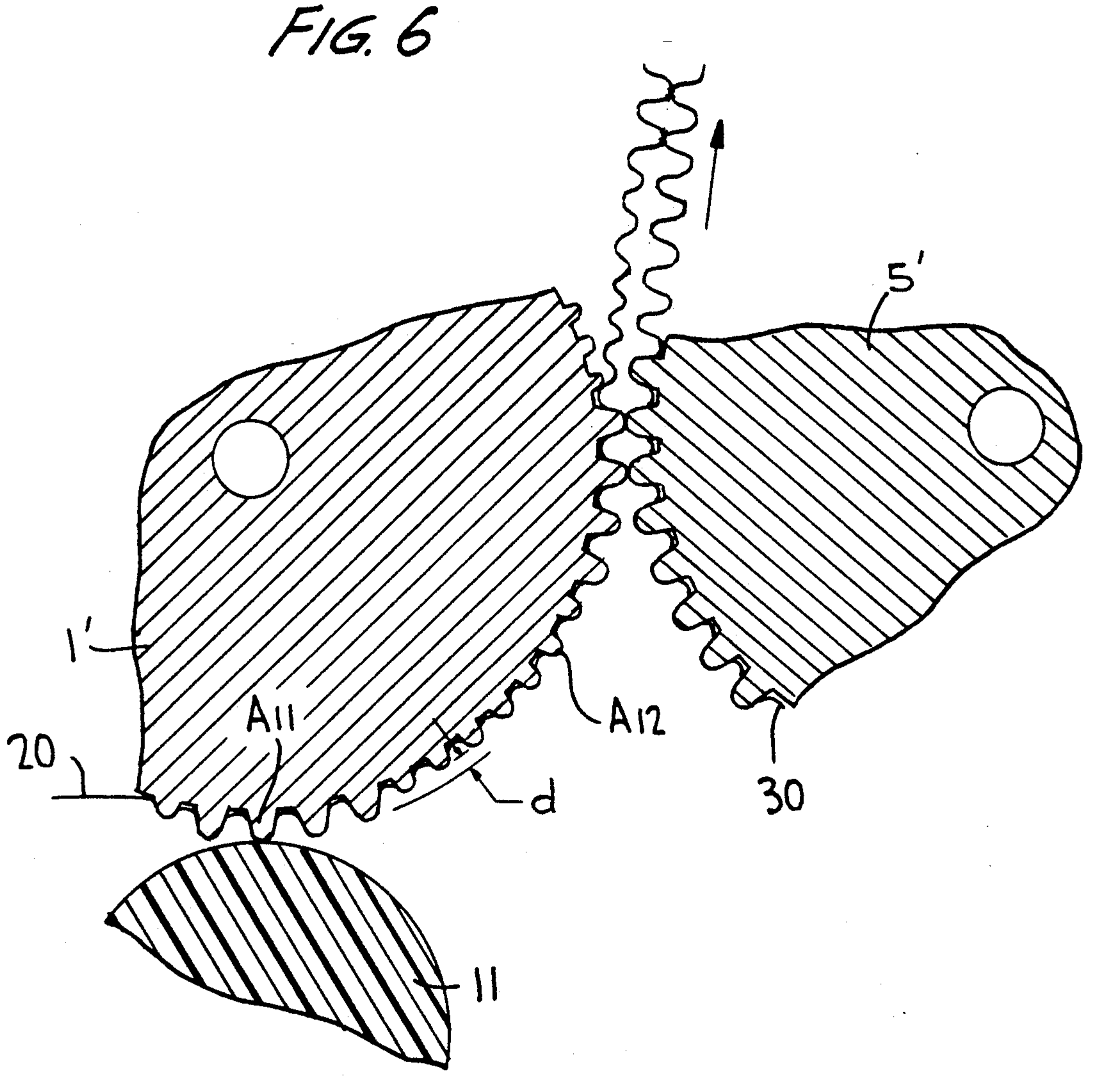
FIG. 6 shows a protuberances design on embossing cylinders which provides partial glue bonding.

Another means of lessening the amount of glue applied is to engrave one of the cylinders, for example cylinder 1, in such manner that the resulting bosses are not equal in height. Accordingly, only the highest bosses will receive glue since they will be the only points coming into contact with the glue depositing cylinder. FIG. 6 illustrates such an example with respect to metal cylinders 1' and 5' and the respective bosses formed therein. The two sheets 20 and 30 embossed by the cylinders are glued together at the tops of the protuberances which make contact when the sheets are passed through the nip present between cylinders 1' and 5'. According to the embodiment shown in FIG. 6, the bosses of cylinder 1' are of differing heights. Only bosses $A_{11}$ having a height which exceeds by an amount "d" the height of bosses $A_{12}$ make contact with the surface of the smooth gluing cylinder 11 and then make contact with the bosses of cylinder 5'. Accordingly, sheets 20 and 30 are bonded only at these bosses. It is possible in this manner to arbitrarily lower the number of spots capable of bonding. For example, in relation to the pattern shown in FIG. 4, bonding spots can be formed at the intersections of the pattern of FIG. 4 based on the positioning of bosses $A_{11}$.

As will be apparent to one skilled in the art, various modifications can be made within the scope of the aforesaid description. Such modifications being within the ability of one skilled in the art form a part of the present invention and are embraced by the appended claims.

It is claimed:

1. A combined sheet material comprising at least two absorbent sheets wherein each of said sheets has a basis weight of between from 10 to 40 g/m$^2$, each of said sheets is separately embossed by calendaring such that each of said sheets has a pattern of protuberances formed therein which are distributed in said pattern along a first pitch in a first direction, $P_1sm$ and $P_2sm$ respectively for said at least two absorbent sheets, and along a second pitch in a second direction, $P_1st$ and $P_2st$ respectively for said at least two absorbent sheets, said second direction subtending said first direction at an angle other than zero, with said first pitch along said first direction of each of said sheets being different and related by the expression $$|1/P_1sm - 1/P_2sm| \geqq 1/L1$$

wherein $P_1sm$ is said first pitch of a first sheet in said first direction, $P_2sm$ is said first pitch of a second sheet in said first direction and L1 is a predetermined value corresponding to the dimension of a segment within said combined sheet material having at least one spot capable of bonding said at least two sheets together, and wherein each end of said protuberances in said sheets extending away from the plane of said sheets comprises a flat bonding element at which location said protuberances of each of said sheets are bonded to each other.

2. A combined sheet material according to claim 1 wherein said second pitch along said second direction of each of said sheets are different from each other and are selected as a function of a predetermined value L2 which corresponds to the dimension of a segment within said combined sheet material in which at least one spot capable of bonding said at least two sheets together is present.

3. A combined sheet material according to claim 2 wherein said values L1 and L2 correspond to individual rectangular sheets which are to be cut out of said combined sheet material.

4. A combined sheet material according to claim 1, claim 2 or claim 3 wherein said first pitch and said second pitch are determined in such a manner that the ratio of the most dense pattern pitch to the least dense pattern pitch is between from 1 to 2.

5. A combined sheet material according to claim 1 wherein the density of said protuberances in said pattern is between from 20 to 300 protuberances per cm$^2$.

6. A combined sheet material according to claim 1 wherein the combined area of said flat bonding elements on each of said absorbent sheets is between from 5 to 30% of the area of each of said sheets before each of said sheets is embossed.

7. A combined sheet material according to claim 1 wherein said pattern formed by said protuberances in each of said sheets is different.

8. A combined sheet material according to claim 1 wherein the number of said protuberances which are bonded to each other is less than the number of protuberances present in each of said sheets.

9. A combined sheet material according to claim 8 wherein said embossing of at least one of said at least two sheets is carried out using protuberances having a first height and protuberances having a second height which is less than the height of said first height so that when said absorbent sheets are bonded together said bond is provided solely by the joinder of said protuberance having said first height.

* * * * *